United States Patent
Lin et al.

(10) Patent No.: US 10,791,006 B1
(45) Date of Patent: Sep. 29, 2020

(54) ELECTRONIC SYSTEM WITH RFI CANCELATION MECHANISM AND RELATED RFI CANCELATION METHOD

(71) Applicant: Realtek Semiconductor Corp., HsinChu (TW)

(72) Inventors: Chia-Chang Lin, Tainan (TW); Li-Chung Chen, Hsinchu County (TW); Ching-Yao Su, Hsinchu County (TW); Yuan-Jih Chu, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/747,488

(22) Filed: Jan. 20, 2020

(30) Foreign Application Priority Data

Sep. 17, 2019 (TW) .............................. 108133323 A

(51) Int. Cl.
*H04B 1/12* (2006.01)
*H04L 25/03* (2006.01)

(52) U.S. Cl.
CPC ........ *H04L 25/03019* (2013.01); *H04B 1/123* (2013.01); *H04L 2025/037* (2013.01); *H04L 2025/03611* (2013.01); *H04L 2025/03808* (2013.01)

(58) Field of Classification Search
USPC .......................... 375/229, 222, 350, 346, 148
See application file for complete search history.

(56) References Cited

U.S. PATENT DOCUMENTS

| | | | |
|---|---|---|---|
| 5,596,600 A * | 1/1997 | Dimos | G01S 19/21 370/208 |
| 7,010,027 B1 * | 3/2006 | Mestdagh | H04L 5/003 370/203 |
| 9,270,308 B2 * | 2/2016 | Chen | H04B 1/109 |
| 10,630,326 B1 * | 4/2020 | Gupta | H04B 1/10 |
| 2001/0028692 A1 * | 10/2001 | Wiese | H04L 5/0062 375/346 |
| 2015/0311928 A1 * | 10/2015 | Chen | H04B 1/109 375/350 |

* cited by examiner

*Primary Examiner* — Eva Y Puente
(74) *Attorney, Agent, or Firm* — Winston Hsu

(57) ABSTRACT

An electronic system includes a feedforward equalizer, a feedback equalizer, an RFI canceler, and a control circuit. The feedforward equalizer and the feedback equalizer are configured to adjust the channel response of a transmission channel in the electronic system. The RFI canceler is configured to cancel the RFI presence in the electronic system. When the RFI canceler is off, the controller is configured to turn on the RFI canceler according to a signal error value before RFI cancelation, an error term of the electronic system, or an SNR of the electronic system.

12 Claims, 2 Drawing Sheets

ELECTRONIC SYSTEM WITH RFI CANCELATION MECHANISM AND RELATED RFI CANCELATION METHOD

CROSS REFERENCE TO RELATED APPLICATION

This application claims priority of Taiwan Application No. 108133323 filed on 2019 Sep. 17.

BACKGROUND OF THE INVENTION

1. Field of the Invention

The present invention is related to an electronic system with RFI cancelation mechanism and related RFI cancelation method, and more particularly, to an electronic system with low-power and highly efficient RFI cancelation mechanism and related RFI cancelation method.

2. Description of the Prior Art

With rapid development in communication and VLSI technologies, wired and wireless communication applications are surging in popularity. The radio environment of the newest network can be complicate when it is inherently backward compatible with older generations of technologies. Meanwhile, wireless radio devices for digital television broadcasting and local networks are constant signal sources which may interfere with existing radio services. With more and more new radio services competing for a limited amount of suitable base stations, growing inter-device interferences have become more problematic. Also, with increasing number of smart devices capable of radio frequency (RF) communication, there is a need of preventing radio frequency interference (RFI) from influencing communication quality.

SUMMARY OF THE INVENTION

The present invention provides an electronic system with RFI cancelation mechanism and includes a feedforward equalizer, a feedback equalizer, an RFI canceler, and a control circuit. The feedforward equalizer is configured to adjust a channel response of a transmission channel in the electronic system and cancel an RFI presence in the electronic system/. The feedback equalizer is configured to adjust the channel response of the transmission channel in the electronic system. The RFI canceler is configured to cancel the RFI presence in the electronic system. The control circuit is configured to determine whether the RFI canceler which is currently deactivated should be activated according to a signal error value before RFI cancelation, an error term of the electronic system, or an SNR of the electronic system, and determine whether the RFI canceler which is currently activated should be deactivated according to a response of the RFI canceler, the signal error value before RFI cancelation, the error term of the electronic system, or the SNR of the electronic system.

The present invention also provides a method of performing RFI cancelation. The method includes a feedforward equalizer in an electronic system adjusting a channel response of a transmission channel in the electronic system and canceling an RFI presence in the electronic system, a feedback equalizer in the electronic system adjusting the channel response of the transmission channel in the electronic system, detecting a response of an RFI canceler in the electronic system or a signal error value before RFI cancelation, detecting an error term or an SNR of the electronic system, and determining whether the RFI canceler which is currently deactivated should be activated according to the signal error value before RFI cancelation, the error term of the electronic system, or the SNR of the electronic system.

The present invention also provides a method of performing RFI cancelation. The method includes a feedforward equalizer in an electronic system adjusting a channel response of a transmission channel in the electronic system and canceling an RFI presence in the electronic system, a feedback equalizer in the electronic system adjusting the channel response of the transmission channel in the electronic system, detecting a response of an RFI canceler in the electronic system or a signal error value before RFI cancelation, and determining whether the RFI canceler which is currently activated should be deactivated according to the response of the RFI canceler, the signal error value before RFI cancelation, the error term of the electronic system, or the SNR of the electronic system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
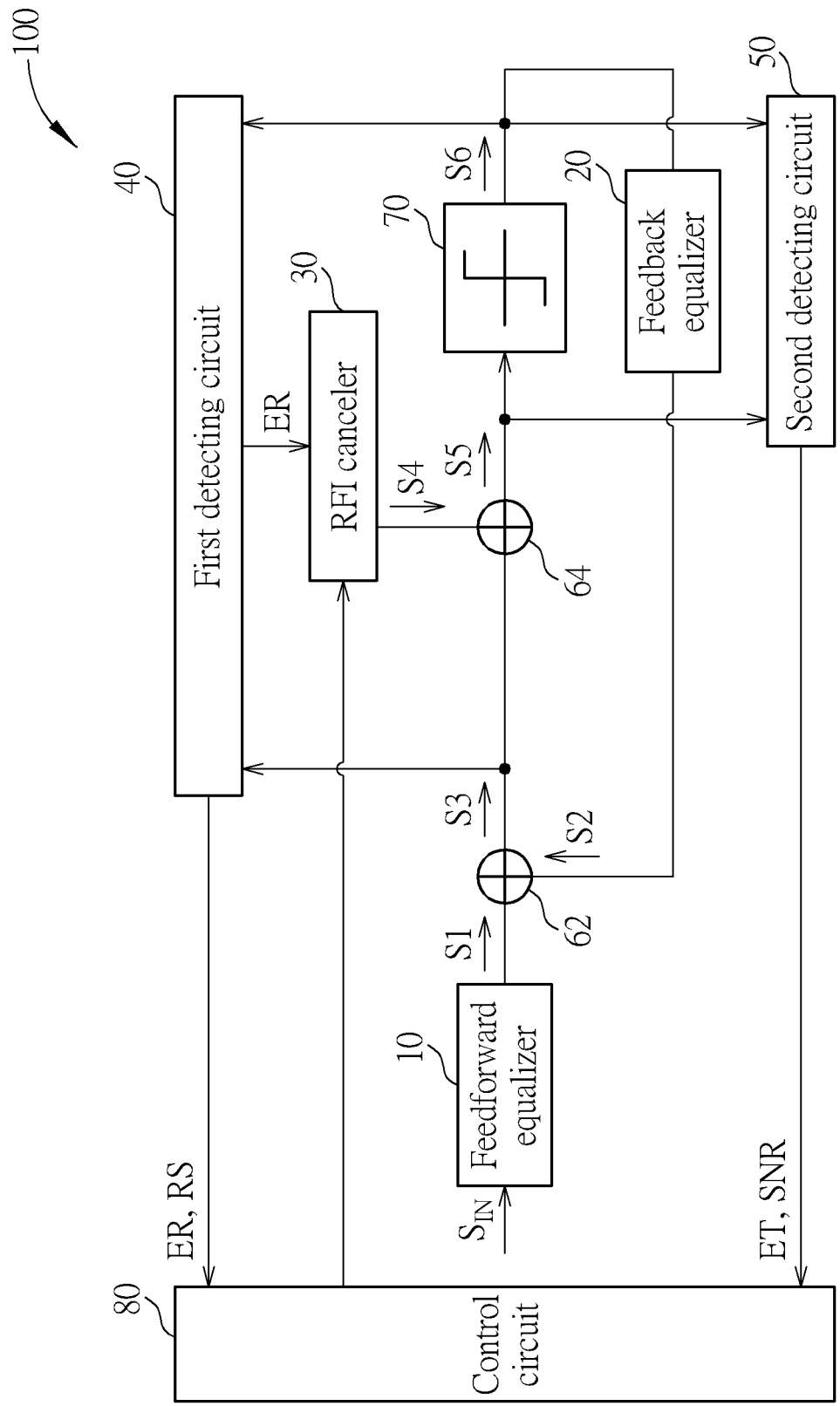
FIG. 1 is a function diagram illustrating an electronic system with highly efficient and low-power RFI cancelation mechanism according to an embodiment of the present invention.

FIG. 1 is a function diagram illustrating an electronic system 100 with highly efficient and low-power RFI cancelation mechanism according to an embodiment of the present invention. The electronic system 100 includes a feedforward equalizer (FFE) 10, a feedback equalizer (FBE) 20, an RFI canceler 30, a first detecting circuit 40, a second detecting circuit 50, two adders 62 and 64, a slicer 70, and a control circuit 80. The feedforward equalizer 10 is configured to generate a signal S1 according to an input signal $S_{IN}$ received at its input end. With two input ends respectively coupled to the output ends of the feedforward equalizer 10 and the feedback equalizer 20, the adder 62 is configured to generate a signal S3 according to the signal S1 outputted by the feedforward equalizer 10 and the signal S2 outputted by the feedback equalizer 20. With two input ends respectively coupled to the output ends of the RFI canceler 30 and the adder 62, the adder 64 is configured to generate a signal S5 according to the signal S3 outputted by the adder 62 and the signal S4 outputted by the RFI canceler 30. With its input end coupled to the output end of the adder 64 and its output end coupled to the input end of the feedback equalizer 20, the slicer 70 is configured to generate a digital signal S6 according to the digital signal S5 outputted by the adder 64. The feedback equalizer 20 is configured to generate the signal S2 according to the signal S6 outputted by the slicer 70.

With increase in data transmission rate and improved modulation technology, several unwanted phenomenon which downgrade data reliability, such as inter-symbol interference (ISI), cross talk and skew, have become more prominent in communication systems. Therefore, the feedforward equalizer 10 and the feedback equalizer 20 may be used to reduce or cancel possible ISI presence in the electronic system 100 of the present invention. Typically, the feedforward equalizer 10 and the feedback equalizer 20 include digital filters capable of providing variable responses for compensating the impact of the transmission channel. By adjusting the coefficient of a digital filter, the response of the digital filter may approximate the reciprocal of the channel response of the transmission channel, thereby compensating the impact of ISI.

Briefly speaking, the feedforward equalizer 10 may perform equalization on signals for relieving the equalization loading on the receiving end. The feedforward equalizer 10 is normally implemented using filters with band-limited pulse response and capable of summing up various delayed signals each multiplied by a corresponding weighting factor. The degree of equalization can thus be adjusted by controlling the values of different weighting factors, thereby achieving channel compensation. In an embodiment, since the channel-related signal loss mainly occurs when the value of a signal is converted from logic 0 to logic 1 or vice versa, the feedforward equalizer 10 may be implemented using digital high-pass filters. More specifically, the signal S1 may be provided by increasing the high-frequency components in the input signal $S_{IN}$, and channel loss can be compensated by sending more power during signal conversion. However, the implementation of the feedforward equalizer 10 does not limit the scope of the present invention.

Briefly speaking, the feedback equalizer 20 may feed the signal S6 to the signal S1. Based on a detected bit, the feedback equalizer 20 can calculate the ISI caused by this detected bit, thereby canceling the ISI caused by this detected bit on subsequent serial bits. In an embodiment, the feedback equalizer 20 may be implemented using digital high-pass filters capable of amplifying high-frequency signals without amplifying high-frequency noises using a non-linear equilibrium technique (the signal S6 is a digital signal having a time delay with respect to the original digital input signal $S_{IN}$). However, the implementation of the feedback equalizer 20 does not limit the scope of the present invention.

In an embodiment of the present invention, the feedforward equalizer 10 and the feedback equalizer 20 may acquire optimum filter coefficients using a least mean square (LMS) algorithm, a normalized least mean square (NLMS) algorithm, a recursive least square (RLS) algorithm, or another algorithm. However, the algorithm adopted by the feedforward equalizer 10 or the feedback equalizer 20 does not limit the scope of the present invention.

The adder 62 is configured to sum up the feedforward equalized signal S1 and the feedback equalized signal S2, and then output the corresponding signal S3 with channel compensation. In an embodiment, the adder 62 may be implemented using appropriate amount and type of logic gates. However, the implementation of the adder 62 does not limit the scope of the present invention.

Since the feedforward equalizer 10 and the feedback equalizer 20 mainly aim at channel compensation, they are unable to efficiently cancel RFI presence in the electronic system 100. Therefore, the RFI canceler 30 is further adopted for canceling the impact of RFI presence in the electronic system 100. The RFI canceler 30 is configured to generate the compensation signal S4 having the same amplitude and the opposite phase as the RFI signal in the signal S3 for compensating the impact of the RFI signal. More specifically, the RFI canceler 30 is configured to acquire a converged response required for RFI cancelation based on a signal error value ER which was acquired prior to RFI cancelation (hereafter as the signal error value ER before RFI cancelation). In an embodiment, the RFI canceler 30 may be implemented using adaptive filters capable of filtering original signals using multiple time-delay techniques, thereby achieving RFI cancelation. However, the technique adopted by the RFI canceler 30 does not limit the scope of the present invention.

The adder 64 is configured to sum up the signal S3 with channel compensation and the signal S4 for RFI compensation, and then output the corresponding signal S5 with RFI cancelation. In an embodiment, the adder 64 may be implemented using appropriate amount and type of logic gates. However, the implementation of the adder 64 does not limit the scope of the present invention.

The slicer 70 is configured to perform data slicing on the signal S5 using a fixed slicing pattern (a predetermined threshold of a constant value). More specifically, the slicer 70 is configured to generate the digital signal S6 equal to 0 or 1 according to whether the digital signal S5 is larger than the predetermined threshold value. In an embodiment, the slicer 70 may be implemented using a clamping circuit, capacitors or comparators. However, the implementation of the slicer 70 does not limit the scope of the present invention.

The first detecting circuit 40 is configured to detect the values of the signals S3 and S6, calculate a response RS of the RFI canceler 30 and the signal error value ER before RFI cancelation accordingly, and send the calculation result to the control circuit 80. As previously stated, the RFI canceler 30 is configured to acquire a converged response RS based on the signal error value ER before RFI cancelation. A larger RFI presence in the electronic system 100 results in a larger response RS and a larger signal error value ER before RFI cancelation.

The second detecting circuit 50 is configured to detect the values of the signals S5 and S6, calculate an error term ET or a signal-to-noise ratio (SNR) of the electronic system 100 accordingly, and send the calculation result to the control circuit 80. A larger RFI presence in the electronic system 100 results in a smaller SNR of the electronic system 100.

Figure 2:
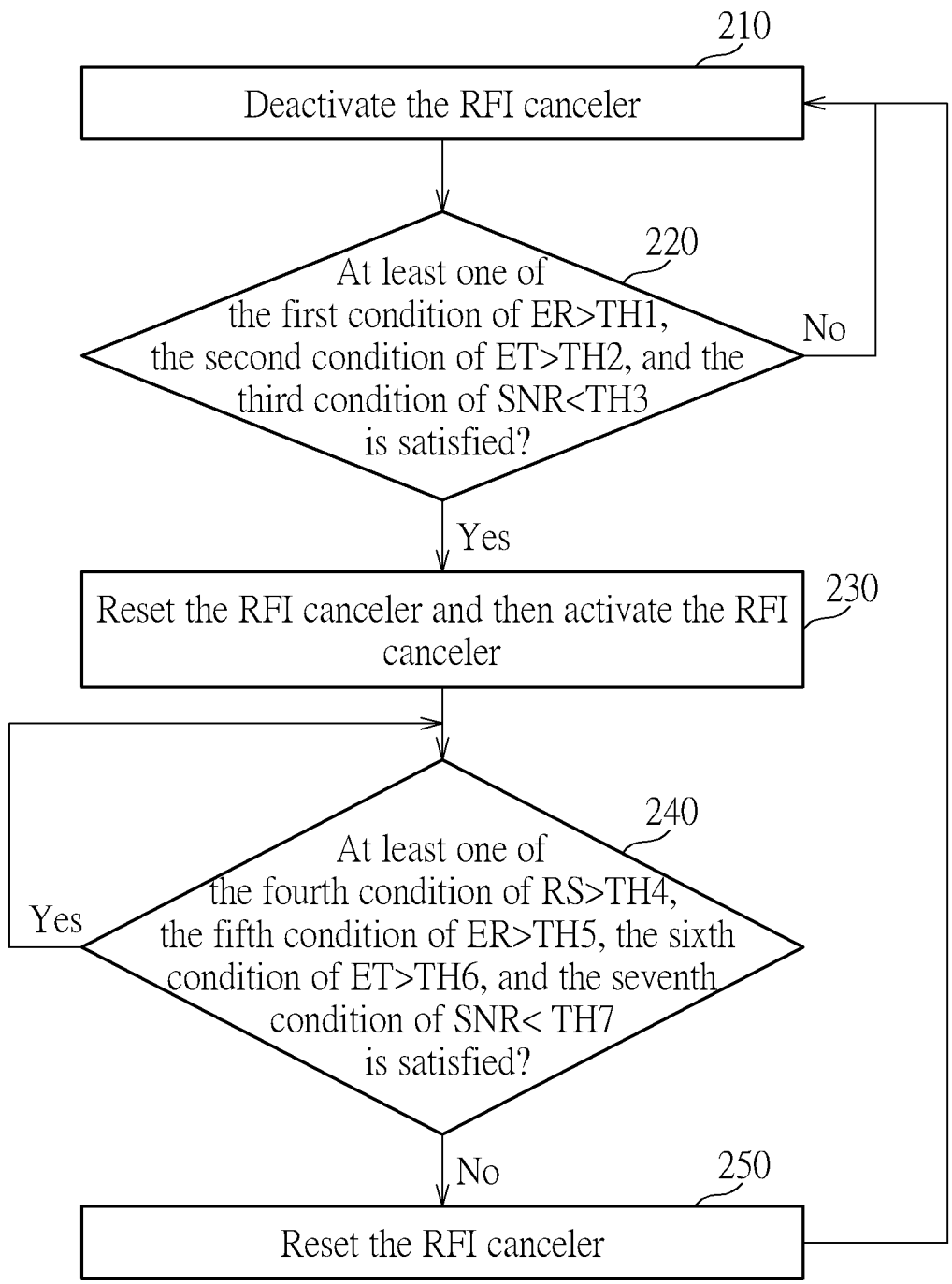
FIG. 2 is a flowchart illustrating the operation of the electronic system according to an embodiment of the present invention.

FIG. 2 is a flowchart illustrating the operation of the electronic system 100 according to an embodiment of the present invention. The flowchart in FIG. 2 includes the following steps:

Step 210: deactivate the RFI canceler 30; execute step 220.

Step 220: determine whether at least one of first through third conditions is satisfied, wherein the first condition is that the signal error value ER before RFI cancelation is larger than a first threshold value TH1, the second condition is that the error term ET of the electronic system. 100 is larger than a second threshold value TH2, and the third condition is that the SNR of the electronic system 100 is smaller than a third threshold value TH3; if yes, execute step 230; if no, execute step 210.

Step 230: reset the RFI canceler 30 and then activate the RFI canceler 30; execute step 240.

Step 240: determine whether at least one of fourth through seventh conditions is satisfied, wherein the fourth condition is that the response RS of the RFI canceler 30 is larger than a fourth threshold value TH4, the fifth condition is that the signal error value ER before RFI cancelation is larger than a fifth threshold value TH5, the sixth condition is that the error term ET of the electronic system 100 is larger than a sixth threshold value TH6, and the seventh condition is that the SNR of the electronic system. 100 is smaller than a seventh threshold value TH7; if yes, execute step 240; if no, execute step 250.

Step 250: reset the RFI canceler 30; execute step 210.

In step 210, the electronic system 100 is configured to deactivate the RFI canceler 30. Since an automotive electronic system is a low-power system, the RFI canceler 30 is normally deactivated in the initial state, and then can be activated according to the determination result in step 220.

Instep 220, the control circuit 80 is configured to determine whether the RFI canceler 30 should be activated according to the first through the third conditions, wherein the first condition is that the signal error value ER before RFI cancelation is larger than the first threshold value TH1, the second condition is that the error term ET of the electronic system 100 is larger than the second threshold value TH2, and the third condition is that the SNR of the electronic system 100 is smaller than the third threshold value TH3. The RFI presence in the electronic systems results in the decay of the converged SNR, which may even influence the transmission of data packages. The RFI canceler 30 is configured to acquire a corresponding response according to the signal error value ER before RFI cancelation for canceling out the effect of the error term ET. Therefore, when the first condition, the second condition, or the third condition is satisfied, it means that there may be RFI presence in the electronic system 100.

In an embodiment, when any of the first through the third conditions is satisfied, the control circuit 80 determines that the RFI presence in the electronic system 100 can critically impair communication quality. In another embodiment, when all of the first through the third conditions are satisfied, the control circuit 80 determines that the RFI presence in the electronic system 100 can critically impair communication quality. Under each circumstance, step 230 is executed for resetting the RFI canceler 30 and then activating the RFI canceler 30, thereby efficiently canceling the impact of the RFI presence in the electronic system 100.

Since the operation of the RFI canceler 30 consumes a lot of power, it can be deactivated for power-saving purpose when the demand of RFI cancelation is low. In step 240, the control circuit 80 is configured to determine whether the RFI canceler 30 should be deactivated according to the fourth through the seventh conditions, wherein the fourth condition is that the response RS of the RFI canceler 30 is larger than the fourth threshold value TH4, the fifth condition is that the signal error value ER before RFI cancelation is larger than the fifth threshold value TH5, the sixth condition that the error term ET of the electronic system 100 is larger than the sixth threshold value TH6, and the seventh condition that the SNR of the electronic system 100 is smaller than the seventh threshold value TH7. As previously stated, the RFI presence in the electronic system 100 results in the decay of the converged SNR, which may even influence the transmission of data packages. The RFI canceler 30 is configured to acquire a corresponding response according to the signal error value ER before RFI cancelation for canceling out the effect of the error term ET, wherein the response RS of the RFI canceler 30 is proportional to the amount of RFI presence in the electronic system 100. Therefore, when the fourth condition, the fifth condition, the sixth condition or the seventh condition is satisfied, it means that there may still be RFI presence in the electronic system 100.

In an embodiment, when any of the fourth through the seventh conditions is satisfied, the control circuit 80 determines that the RFI presence in the electronic system 100 can still impair communication quality. In another embodiment, when all of the fourth through the seventh conditions are satisfied, the control circuit 80 determines that the RFI presence in the electronic system 100 can still impair communication quality. Under each circumstance, step 240 is re-executed while the RFI canceler 30 remains activated.

In step 240, when none of the fourth through the seventh conditions is satisfied, the control circuit 80 determines that there is no longer RFI presence in the electronic system 100 or that the RFI presence in the electronic system 100 no longer impairs communication quality. Under such circumstance, step 250 is executed for resetting the RFI canceler 30 and then step 210 is executed for deactivating the RFI canceler 30, thereby reducing power consumption of the electronic system 100.

In an embodiment, the electronic system 100 is implemented with digital circuits which handle digital signals. In another embodiment, a part of the electronic system 100 may be implemented using an analog circuit.

In the electronic system 100 of the present invention, the feedforward equalizer 10, the feedback equalizer 20 and the RFI canceler 30 are adopted for performing RFI cancelation. When determining that the RFI presence in the electronic system 100 can impair communication quality, the feedforward equalizer 10, the feedback equalizer 20 and the RFI canceler 30 are all activated for efficiently canceling the impact of the RFI presence in the electronic system 100. When determining that the RFI presence in the electronic system 100 does not impair communication quality, the feedforward equalizer 10 and the feedback equalizer 20 are activated, while the RFI canceler 30 is deactivated for reducing power consumption in response to low RFI cancelation demand.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system with radio-frequency interference (RFI) cancelation mechanism, comprising:
   a feedforward equalizer configured to adjust a channel response of a transmission channel in the electronic system and cancel an RFI presence in the electronic system;
   a feedback equalizer configured to adjust the channel response of the transmission channel in the electronic system;
   an RFI canceler configured to cancel the RFI presence in the electronic system; and
   a control circuit configured to:
      determine whether the RFI canceler which is currently deactivated should be activated according to a signal error value before RFI cancelation, an error term of the electronic system, or a signal-to-noise ratio (SNR) of the electronic system; and
      determine whether the RFI canceler which is currently activated should be deactivated according to a response of the RFI canceler, the signal error value before RFI cancelation, the error term of the electronic system, or the SNR of the electronic system.

2. The electronic system of claim 1, further comprising:
   a first adder, comprising:
      a first input end coupled to an output end of the feedforward equalizer;
      a second input end coupled to an output end of the feedback equalizer; and an output end;
a second adder, comprising:
  a first input end coupled to an output end of the RFI canceler;
  a second input end coupled to an output end of the first adder; and
  an output end; and
a slicer, comprising:
  an input end coupled to the output end of the second adder; and
  an output end coupled to the output end of the feedback equalizer.

3. The electronic system of claim 2, further comprising:
a first detector configured to provide the response of the RFI canceler or the signal error value before RFI cancelation, and comprising:
  a first end coupled between the output end of the first adder and the second input end of the second adder;
  a second end coupled to the output end of the slicer; and
  an output end coupled to the control circuit; and
a second detector configured to provide the error term of the electronic system or the SNR of the electronic system, and comprising:
  a first end coupled the input end of the slicer;
  a second end coupled to the output end of the slicer; and
  an output end coupled to the control circuit.

4. A method of performing radio-frequency interference (RFI) cancelation, comprising:
a feedforward equalizer in an electronic system adjusting a channel response of a transmission channel in the electronic system and canceling an RFI presence in the electronic system;
a feedback equalizer in the electronic system adjusting the channel response of the transmission channel in the electronic system;
detecting a response of an RFI canceler in the electronic system or a signal error value before RFI cancelation;
detecting an error term or an SNR of the electronic system; and
determining whether the RFI canceler which is currently deactivated should be activated according to the signal error value before RFI cancelation, the error term of the electronic system, or the SNR of the electronic system.

5. The method of claim 4, further comprising:
activating the RFI canceler which is currently deactivated when determining that the signal error value before RFI cancelation is larger than a first threshold value, the error term of the electronic system is larger than a second threshold value, or the SNR of the electronic system is smaller than a third threshold value.

6. The method of claim 5, further comprising:
resetting the RFI canceler before activating or deactivating the RFI canceler.

7. The method of claim 4, further comprising:
determining whether the RFI canceler which is currently activated should be deactivated according to the response of the RFI canceler, the signal error value before RFI cancelation, the error term of the electronic system, or the SNR of the electronic system.

8. The method of claim 7, further comprising:
continuing to activate the RFI canceler which is currently activated when determining that the response of the RFI canceler is larger than a fourth threshold value, the signal error value before RFI cancelation is larger than a fifth threshold value, the error term of the electronic system is larger than a sixth threshold value, or the SNR of the electronic system is smaller than a seventh threshold value.

9. The method of claim 8, further comprising:
resetting the RFI canceler before activating or deactivating the RFI canceler.

10. A method of performing RFI cancelation, comprising:
a feedforward equalizer in an electronic system adjusting a channel response of a transmission channel in the electronic system and canceling an RFI presence in the electronic system;
a feedback equalizer in the electronic system adjusting the channel response of the transmission channel in the electronic system;
detecting a response of an RFI canceler in the electronic system or a signal error value before RFI cancelation; and
determining whether the RFI canceler which is currently activated should be deactivated according to the response of the RFI canceler, the signal error value before RFI cancelation, the error term of the electronic system, or the SNR of the electronic system.

11. The method of claim 10, further comprising:
continuing to activate the RFI canceler which is currently activated when determining that the response of the RFI canceler is larger than a first threshold value, the signal error value before RFI cancelation is larger than a second threshold value, the error term of the electronic system is larger than a third threshold value, or the SNR of the electronic system is smaller than a fourth threshold value.

12. The method of claim 11, further comprising:
resetting the RFI canceler before activating or deactivating the RFI canceler.

* * * * *